Oct. 14, 1952 — R. CHILTON — 2,613,784
CENTRIFUGAL CLUTCH
Filed Jan. 24, 1947 — 2 SHEETS—SHEET 1

INVENTOR
ROLAND CHILTON
BY
ATTORNEY

Oct. 14, 1952 — R. CHILTON — 2,613,784
CENTRIFUGAL CLUTCH

Filed Jan. 24, 1947 — 2 SHEETS—SHEET 2

INVENTOR
ROLAND CHILTON.
BY
ATTORNEY

Patented Oct. 14, 1952

2,613,784

UNITED STATES PATENT OFFICE 2,613,784

CENTRIFUGAL CLUTCH

Roland Chilton, Glen Rock, N. J., assignor to Curtiss-Wright Corporation, a corporation of Delaware Application January 24, 1947, Serial No. 724,045

4 Claims. (Cl. 192—105)

This invention relates to friction clutches and is more particularly directed to a centrifugal type friction clutch arranged to engage automatically at a predetermined rotative speed.

An object of the invention comprises the provision of a centrifugal friction clutch having a novel and simple construction in which weight means urged radially outwardly by centrifugal force provides an amplified clutch engaging pressure. A further object of this invention comprises the provision of an anti-friction construction for loading a centrifugal friction clutch whereby, if desired, the clutch may be operated dry—that is, without oil.

The centrifugal clutch of the invention is of general application. However, as herein disclosed, the clutch is designed for use in an automotive transmission so as to disconnect the engine from the vehicle driving wheels at low engine speeds (that is, during engine idling) and to automatically initiate clutch engagement when the engine speed exceeds a predetermined value of, say 500 R. P. M. Also, it is desirable that, from the time the clutch starts to engage, only a relatively small increase in speed—for example, to 700 R. P. M.—is necessary to apply sufficient clutch engaging pressure to transmit full engine torque. Accordingly, an object of this invention comprises the provision of a centrifugal clutch which, once the clutch starts to engage, requires only a relatively small increase in its rotative speed to attain a clutch engaging pressure sufficient to prevent slipping of the clutch.

Automotive vehicles are operated over a wide range of engine speeds which may exceed 3000 R. P. M. and, since the centrifugal force acting on the rotating means increases with the square of the speed, it is necessary to provide means to prevent the clutch engaging pressure from becoming excessive in order to prevent damage to the clutch plates. Accordingly, a still further object of the invention comprises the provision of a novel arrangement to prevent the clutch engaging pressure from exceeding a predetermined magnitude.

An associated object of the invention comprises the provision of a centrifugal clutch in which a first spring means is provided to prevent engagement of the clutch until its speed of rotation exceeds a predetermined value and a second spring means is provided to prevent the clutch engaging pressure from exceeding a predetermined value.

A still further object of the invention comprises an anti-friction roller and wedge construction for obtaining an amplified reaction on the clutch plates from the centrifugal force acting on the clutch weights, which construction can be easily manufactured with the necessary accuracy.

Other objects of the invention will become apparent upon reading the annexed detailed description in connection with the drawing in which:

Figure 3 is a sectional view taken along line 3—3 of Figure 2;

Figure 4 is a schematic perspective view of the flywheel portion of the clutch;

Figure 6 is a view of a modified portion of Figure 1; and

Figure 7 is an enlarged view of a portion of Figure 1.

Figure 1:
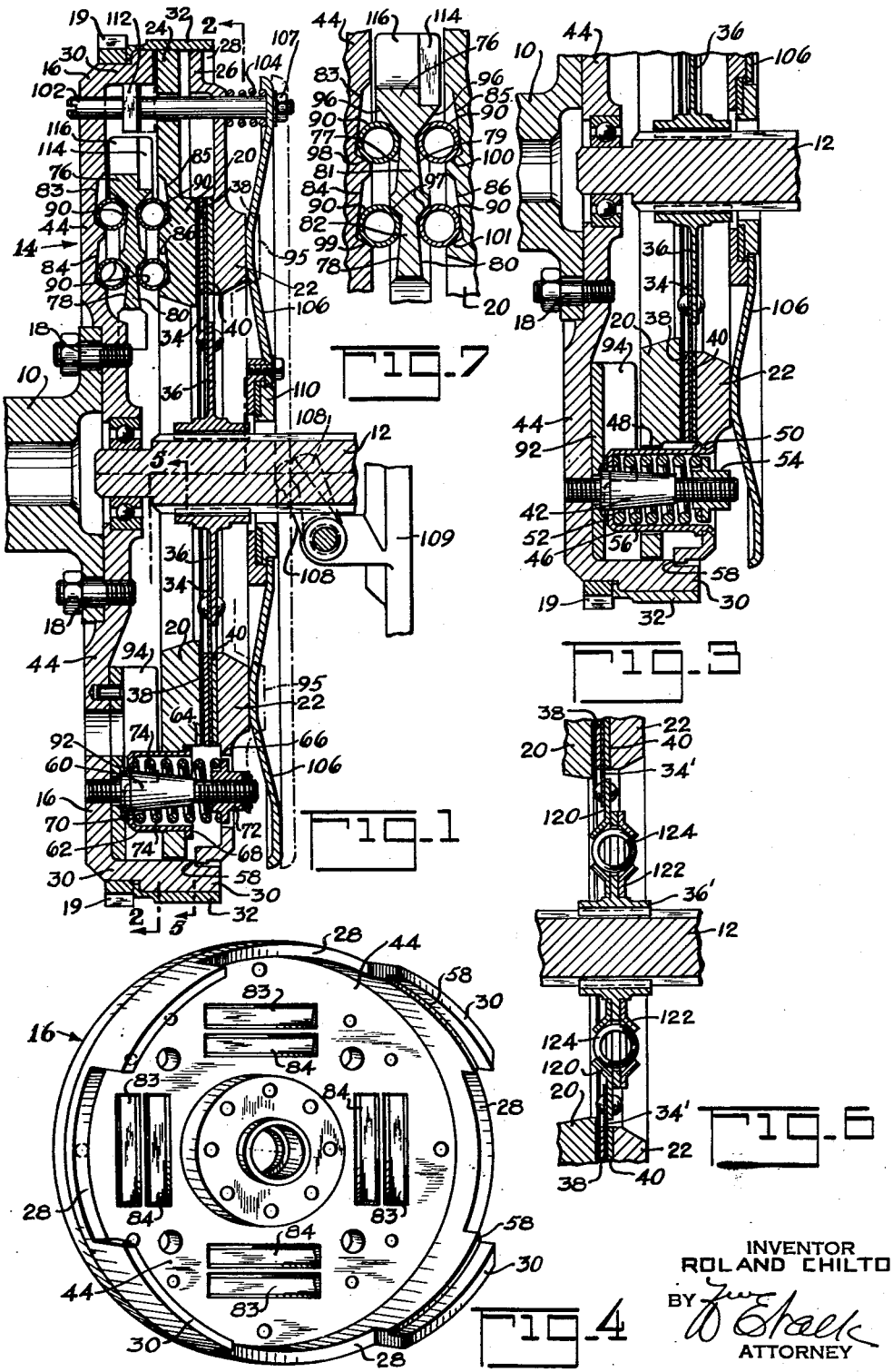
Figure 1 is an axial section taken along line 1—1 of Figure 2 of a centrifugal clutch embodying the invention.

Referring to the drawing, an input shaft 10 is drivably connected to an output shaft 12 by a centrifugal clutch 14. The clutch 14, illustrated in the drawing, is designed for use in an automotive transmission with the shaft 10 comprising an extension of the engine crankshaft and with the shaft 12 being connected to the vehicle driving wheels through a multi-speed transmission. The clutch end of the shaft 10 is secured to a suitable drum or flywheel 16 by bolts 18, said flywheel having the usual starter gear 19 secured thereto. A clutch pressure plate 20 and a clutch backing or retaining plate 22 are each provided with a plurality of circumferentially spaced radially extending driving fingers 24 and 26 respectively received within slots 28 formed in the rim 30 of the flywheel 16. In this way, the plates 20 and 22 are both drivably connected to the shaft 10. A ring 32 is disposed about the flywheel rim 30 for centering the plates 20 and 22.

A clutch plate 34, disposed between the plates 20 and 22, is secured to a hub 36 splined to the output shaft 12. The clutch plate 34 is provided with a pair of friction facings 38 and 40 secured to its opposite sides.

Figure 2:
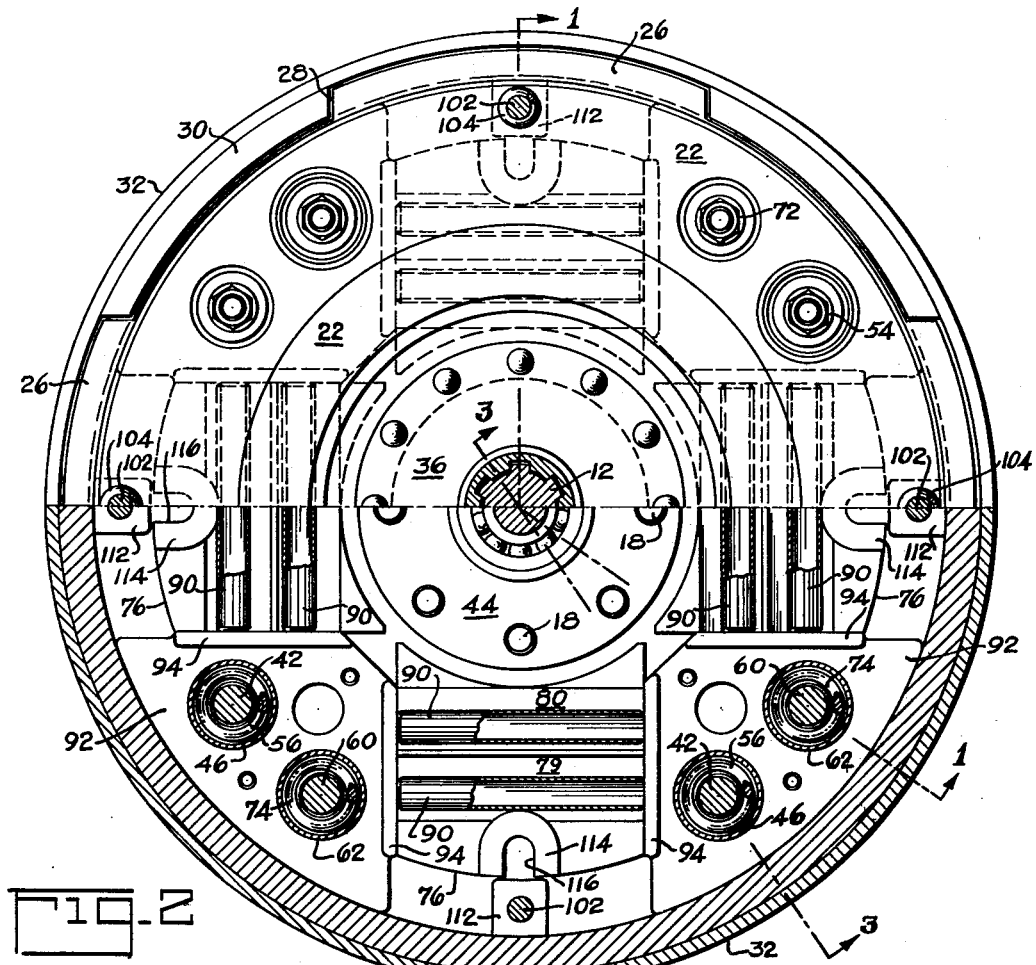
Figure 2 is a sectional view taken along line 2—2 of Figure 1.
Figure 5:
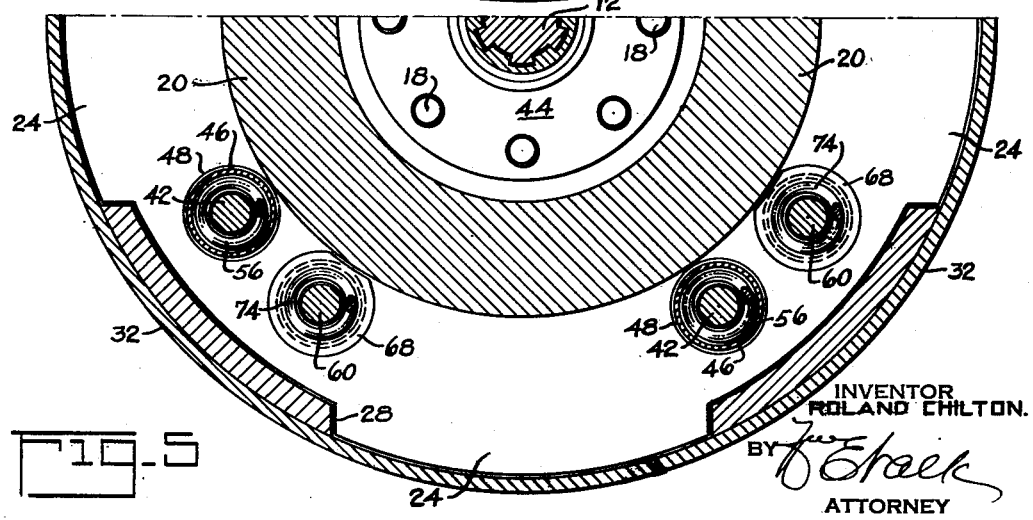
Figure 5 is a sectional view taken along line 5—5 of Figure 1.

As illustrated in Figures 2, 3 and 5, a first set of circumferentially spaced studs 42 are secured to the disc portion 44 of the flywheel 16, each of the studs being co-axially disposed within a cup-shaped member 46 and extending through alined openings 48 and 50 in the plates 20 and 22 respectively. One end of each cup-shaped member 46 is secured in one of the openings 50 in the plate 22 and its other end is provided with an inturned flange 52. The outer end of each stud 42 is provided with an adjustable nut 54 and a spring 56 is disposed between each nut 54 and the flange 52 for urging the retaining plate 22 against a shoulder 58 on the rim 30 of the flywheel.

As illustrated in Figures 1, 2 and 5, a second set of circumferentially spaced studs 60 are secured to the flywheel adjacent the first set of studs 42, each of the studs being co-axially disposed within a cup-shaped member 62 and extending through alined openings 64 and 66 in the plates 20 and 22 respectively. One end of each cup-shaped member 62 is provided with an outwardly directed flange 68 engaging the plate 20 about the periphery of the associated hole 64 and the other end of each cup-shaped member 62 is provided with an inturned flange 70. The outer end of each stud 60 is provided with a nut 72 and a spring 74 is disposed between each nut 72 and the associated flange 70 for urging the pressure plate 20 away from the retaining plate 22—i. e., for urging the clutch 14 to its disengaged condition.

For automatically engaging the clutch 14, a plurality of radially movable circumferentially spaced weights are disposed between the flywheel disc portion 44 and the pressure plate 20. Each weight 76 has an enlarged outer portion and inwardly therefrom is provided with a pair of straight radially spaced grooves 77 and 78 on one side and an oppositely facing pair of grooves 79 and 80 on its opposite side. As illustrated, the grooves are disposed transverse to the clutch axis. The surfaces of the opposite grooves 77 and 79 and the surfaces of the opposite grooves 78 and 80, respectively, converge toward each other in a radially outward direction to define wedge portions 81 and 82. The disc portion 44 of the flywheel is provided with a plurality of pairs of radially spaced grooves 83 and 84, having their surfaces facing and parallel to the surfaces of the grooves 77 and 78 of its associated weight 76. Similarly, the pressure plate 20 is provided with a plurality of pairs of radially spaced grooves 85 and 86 having their surfaces facing and parallel to the surfaces of the grooves 79 and 80 of its associated weight 76. A cylindrical roller 90 is disposed between the face of each groove 83, 84, 85 and 86 and the face of the adjacent weight groove 77, 78, 79 and 80. Guide plates 92 are secured to the flywheel disc portion 44 between the weights 76. The plates 92 have end flanges 94 so disposed that each weight 76 and associated rollers 90 are confined to radial movement by the end flanges 94 of adjacent plates 92.

With this construction, the weights 76 are carried between, and rotate with, the flywheel and the pressure plate 20. Accordingly, upon rotation of the input shaft 10, the weights 76 are urged radially outwardly in response to the centrifugal forces acting thereon. This radially outward movement of the weights 76 is resisted by the springs 74 through the rollers 90. Accordingly, as the speed of rotation increases, a speed is reached, depending on the adjustment of the springs 74, at which the centrifugal force acting on each weight 76 is sufficient to move the weights radially outwardly thereby causing axial movement of the clutch pressure plate 20 to the right against the springs 74 to engage the clutch. For example, in the case of an automotive transmission, the clutch may be designed to engage when the speed of rotation of the input shaft exceeds 500 R. P. M. As the speed of rotation increases, the axial pressure exerted by the weights against the pressure plate 20 increases rapidly because the centrifugal force acting on each of the weights increases with the square of the speed. Also, in the case of an automotive transmission, it is desirable that only a small increase in speed is necessary before the clutch engaging pressure is such that the clutch can transmit full engine torque. Thus, the clutch may be designed to transmit full engine torque when the speed of rotation of the input shaft 10 exceeds, say, 700 R. P. M.

In order to prevent the clutch engaging pressure from becoming excessive at speeds above 700 R. P. M., the pressure-plate springs 56 are adjusted to yield when the speed of rotation of the input shaft 10 exceeds 700 R. P. M., whereby the springs 56 provide a yielding abutment for the clutch retaining plate 22. That is, when the speed of rotation of the input shaft exceeds 700 R. P. M., the axial clutch engaging pressure moves the retaining plate 22 away from the shoulder 58 against the springs 56 thereby preventing any appreciable further increase in the clutch engaging pressure. Upon an increase in speed, above the speed at which the retaining plate 22 is moved away from its stop 58, the weights 76 move further radially outwardly until they abut the flywheel rim 30 whereby the centrifugal force acting on the weights 76 is resisted by the flywheel rim and the clutch engaging pressure is a maximum as determined by the adjustment of the pressure plate springs 56. With the weights 76 disposed radially outwardly against the flywheel rim 30, the retaining plate 22 is moved to the right to the dashed line 95. This construction automatically compensates for any wear of the clutch parts.

The tangent of the angle of convergence between the surfaces of each of the wedge sections 78 and 80 is made small—for example, is equal to $\frac{1}{5}$—whereby, when the retaining plate 22 is held against the stop 58, the axial pressure exerted on the clutch plate 20 by each weight 76 is five times the centrifugal force acting on each weight. The rollers 90 and surfaces engaged thereby comprise a relatively simple anti-friction construction for providing an amplified clutch engaging pressure. Since the opposite sides of the rollers 90 engage parallel surfaces, there is no sliding between the rollers 90 and their engaged surfaces. Accordingly, if desired, the clutch may be operated dry—that is, without lubricating oil. Also, as illustrated, rollers 90 have a hollow thin-walled construction whereby each roller distorts slightly under load in proportion to the magnitude of its load. In this way, the load is distributed substantially evenly between the rollers in spite of manufacturing tolerances.

When the input shaft 10 is idle, the weights 76 are located by the rollers 90 which engage, under pressure from the springs 74, shoulders 96 and 97 formed at the converging ends of the wedge sections 81 and 82 respectively and also engage companion shoulders 98, 99, 100 or 101 of their associated grooves 83, 84, 85 or 86. Accordingly, each time the springs 74 retract the weights 76, said shoulders provide abutment stops limiting inward travel of the weights under pressure from the springs 74 whereby each roller 90 is correctly positioned for subsequent outward movement of its weight 76 even though slight creepage of one or more of the rollers should have occurred while the clutch was engaged. This provision avoids the necessity of providing a cage or other spacing means for the rollers 90.

As best illustrated in Figure 4, each pair of grooves 83 and 84 on the disc portion of the flywheel 16 is disposed radially inwardly of one of the slots 28 in the flywheel rim 30. In addition, each slot 28 is wider than the length of the grooves 83 and 84. With this construction, the slots 28 permit passage of the spindle of a milling cutter and/or grinder thereby facilitating machining of the grooves 83 and 84. Also, since the grooves 77, 78, 79, 80, 83, 84, 85 and 86 are all identical, the same cutter and/or grinder can be used for machining each pair of the grooves whereby the provision of properly matching grooves is made quite simple.

In the case of an automotive transmission, it is desirable that the operator be able to accelerate the engine above its idle range without starting the vehicle—for example, as is conventional practice—in order to keep the engine operating while the engine is still cold. To this end, manually operable means are provided to prevent radially outward movement of the weights 76. Thus, a plurality of pins 102, one for each weight 76, are each slidably supported radially outward of its associated weight within alined holes in the flywheel disc portion 44 and the clutch plates 20 and 22. The pins 102 are urged to the right (Figure 1) by springs 104 and a plate 106 is rigidly secured to these pins by nuts 107. A manually operable control arm 108 is pivotally mounted on a fixed portion 109 of the clutch housing and is adapted to be manually rotated against a bearing plate 110 carried by the plate 106 for urging the pins 102 to the left against the springs 104. As illustrated, leftward movement of the pins 102 is limited by engagement of the annular plate 106 with the clutch retaining plate 22. Each pin 102 is provided with a stop-collar 112 which prevents any appreciably radially outward movement of its associated weight 76 when the pins 102 are in their leftward position as illustrated by their full line position in Figure 1, thereby positively preventing engagement of the clutch 14.

When the control arm 108 is in its right-hand or dotted-line position (Figure 1) the springs 104 move the pins 102 to the right. The right side (Figure 1) of each weight 76 is provided with a recess 114 and a notch 116 adapted respectively to receive its associated stop collar 112 and pin 102 when the pins 102 are thus retracted to the right, thereby permitting radially outward movement of the weights 76. With this construction, by first rotating the control arm 108 to its left-hand position, as illustrated in Figure 1, the operator can accelerate the engine and input shaft 10 to any desired speed without causing engagement of the clutch 14.

For simplicity, each clutch plate 34 has been illustrated as rigidly connected to the output shaft 12. Preferably, however, a two-way resilient connection is interposed therebetween as illustrated in Figure 6. In Figure 7, the clutch plate 34' and hub 36' correspond to the clutch plate 34 and hub 36 respectively of Figure 1 and annular plates 120 and 122 are secured thereto. The plates 120 and 122 are provided with a plurality of substantially rectangular openings with springs 124 retained therein, as illustrated, for transmitting the torque from one of the plates 120 and 122 to the other of these plates. Such two-way resilient connections are conventional and form no part of the present invention.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A centrifugal clutch comprising a rotary input member, a pair of clutch members co-axial with said input member, means drivably connecting one of said clutch members with said input member, said clutch members being movable toward each other for effecting clutch engagement, a weight rotatable with said input member and being radially movable relative to said input member in response to the centrifugal force acting on said weight, said weight having a wedge portion, roller means cooperating with said wedge portion for moving said clutch members into engagement in response to radially outward movement of said weight, an annular rim on said input member and surrounding said weight for limiting radially outward movement of said weight, an abutment rotatable with and movable relative to said input member, and means for moving said abutment to a position approximately radially outwardly of the center of gravity of said weight in engagement with the inner surface of said input member rim and between said input member rim and said weight to prevent clutch engagement by radially outward movement of said weight.

2. A centrifugal clutch comprising a rotary input member, a pair of clutch members coaxial with said input member, means drivably connecting one of said clutch members with said input member, said clutch members being movable toward each other for effecting clutch engagement, a weight rotatable with said input member and being radially movable relative to said input member in response to the centrifugal force acting on said weight, said weight having a wedge portion, roller means cooperating with said wedge portion for moving said clutch members into engagement in response to radially outward movement of said weight, an annular rim on said input member and surrounding said weight for limiting radially outward movement of said weight, an abutment rotatable with and movable relative to said input member, and means for moving said abutment to a position in engagement with the inner surface of said input member rim between said input member rim and said weight to prevent clutch engagement by radially outward movement of said weight.

3. A centrifugal clutch comprising a rotary input member, a pair of clutch members co-axial with said input member, means drivably connecting one of said clutch members with said input member, said clutch members being movable toward each other for effecting clutch engagement, a plurality of circumferentially spaced weights rotatable with said input member, a plurality of pairs of cylindrical rollers, one pair for each of said weights, the rollers of each pair being parallel and spaced radially of each other with the axis of each roller being spaced from and disposed transverse to the clutch axis, each of said rollers having a hollow open-ended tubular construction and having its exterior surface disposed between and in rolling engagement with a wedge surface portion of its associated weight and a surface on one of said members such that said rollers are effective to cause engagement of said clutch members in response to radially outward movement of said weights.

4. A centrifugal clutch comprising a rotary input member, a pair of clutch members co-axial with said input member, means drivably connecting one of said clutch members with said input member, said clutch members being movable toward each other for effecting clutch engagement, a plurality of circumferentially spaced weights rotatable with said input member, a plurality of pairs of cylindrical rollers, each of said weights having a pair of said cylindrical rollers between it and said input member and having another pair of said cylindrical rollers between it and one of said clutch members such that radially outward movement of said weights is effective to cause engagement of said clutch members, each pair of cylindrical rollers being parallel and spaced radially of each other with each roller having a hollow open-ended tubular construction with its axis spaced from and disposed transverse to the clutch axis.

ROLAND CHILTON.

REFERENCES CITED

The following references are of record in the file of this patent:

UNITED STATES PATENTS

| Number | Name | Date |
|---|---|---|
| 1,720,766 | Spahr | July 16, 1929 |
| 1,855,643 | Matthews | Apr. 26, 1932 |
| 1,930,172 | Lalonde | Oct. 10, 1933 |
| 2,145,381 | Wemp | Jan. 31, 1939 |
| 2,172,991 | Segard | Sept. 12, 1939 |
| 2,232,454 | Haupt | Feb. 18, 1941 |
| 2,239,161 | Wemp | Apr. 22, 1941 |
| 2,239,163 | Wemp | Apr. 22, 1941 |
| 2,423,979 | Jenson | July 15, 1947 |

FOREIGN PATENTS

| Number | Country | Date |
|---|---|---|
| 546,782 | Germany | Mar. 17, 1932 |
| 655,371 | Germany | Jan. 14, 1938 |